No. 755,159. PATENTED MAR. 22, 1904.
W. MORTON, DEC'D.
S. C. CARROLL, ADMINISTRATOR.
SELF SEALING MANIFOLDING WRITING SHEET.
APPLICATION FILED DEC. 27, 1902.
NO MODEL. 2 SHEETS—SHEET 1.
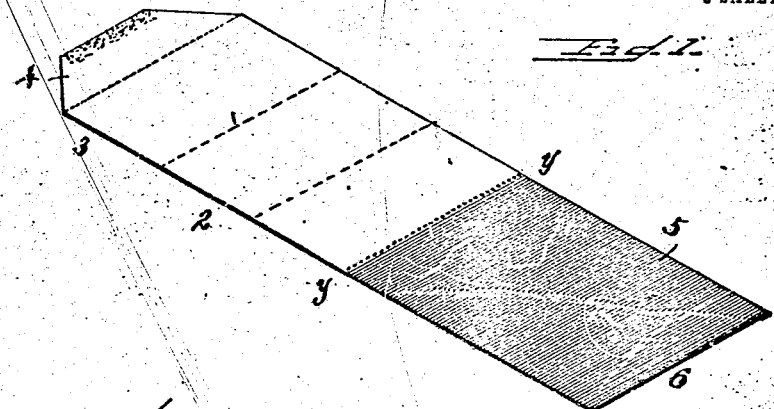
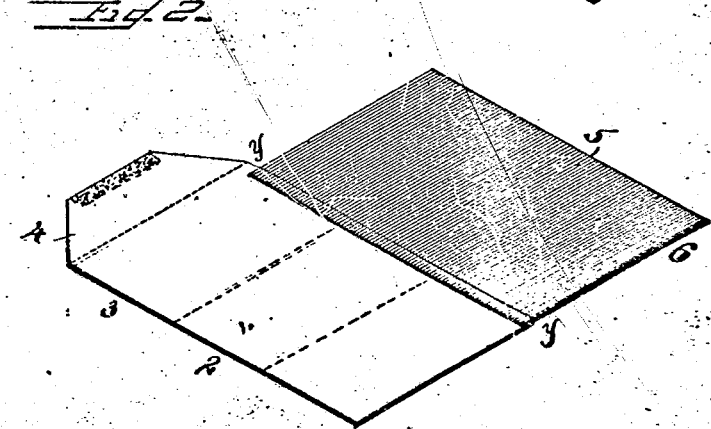
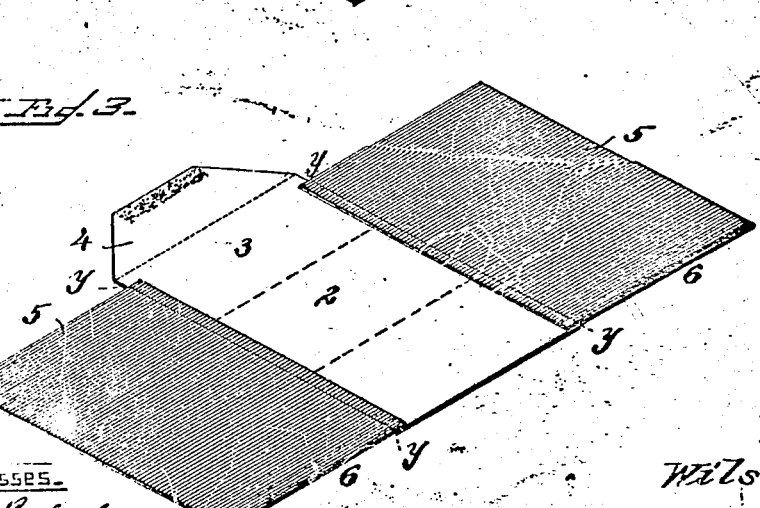
Witnesses:
Inventor
Wilson Morton No. 755,159. PATENTED MAR. 22, 1904.
W. MORTON, DEC'D.
S. C. CARROLL, ADMINISTRATOR.
SELF SEALING MANIFOLDING WRITING SHEET.
APPLICATION FILED DEC. 27, 1902.
NO MODEL. 3 SHEETS—SHEET 2.
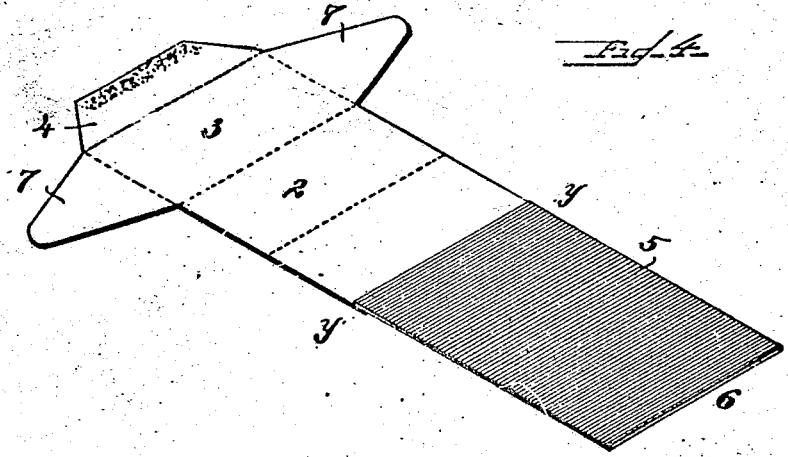
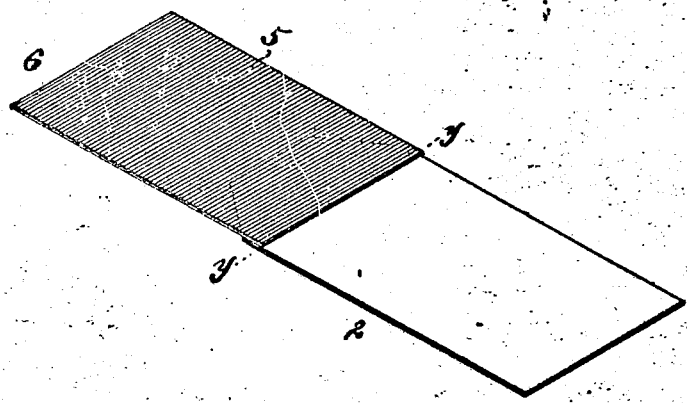
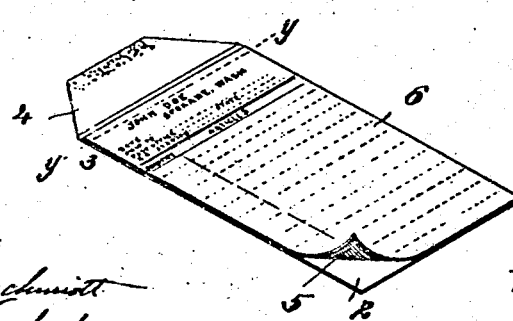
Witnesses:
J. W. Pankerschmidt
J. W. Peckstrom
Inventor:
Wilson Morton,
By Thos. H. Bowman, Atty.

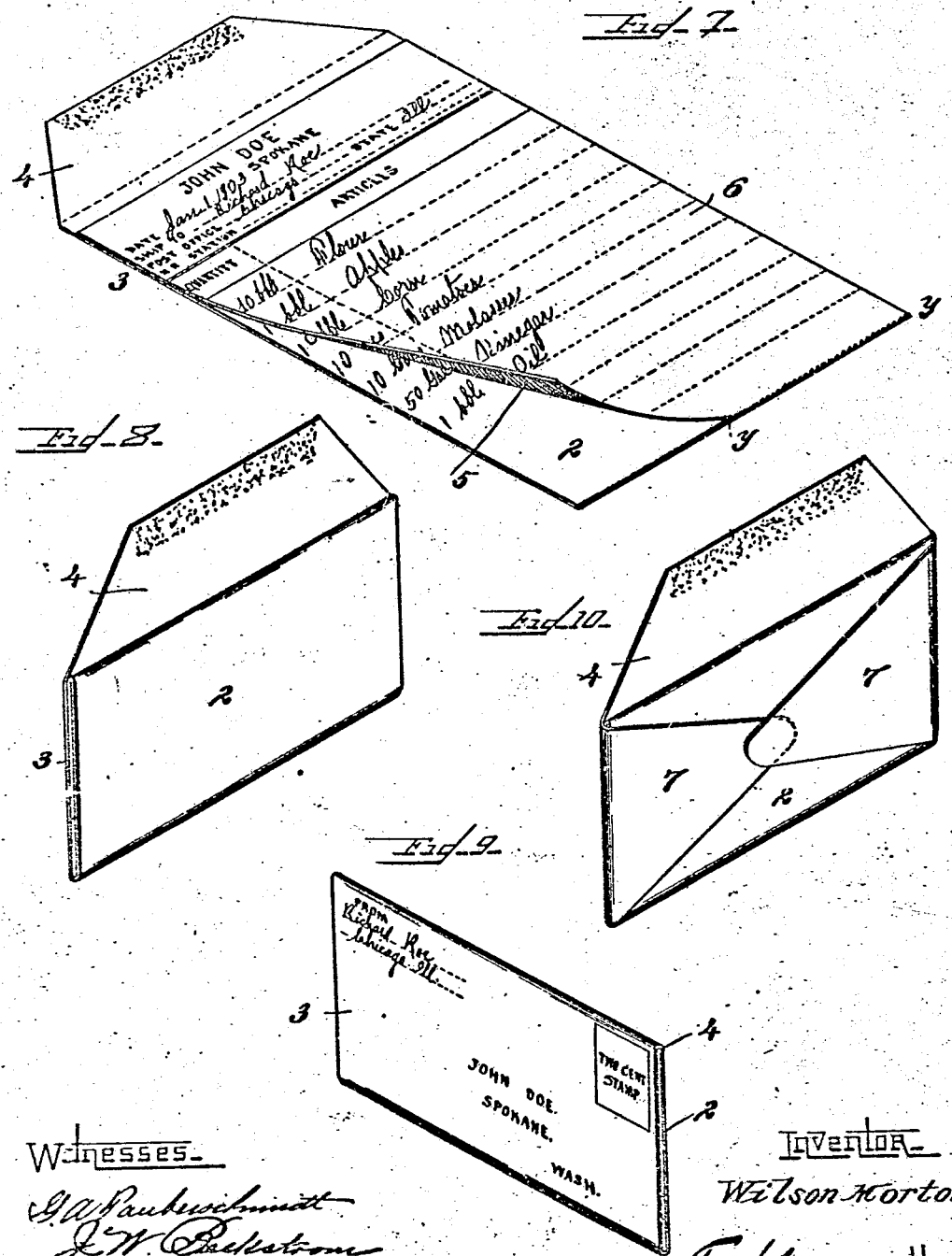

No. 755,159. Patented March 22, 1904.

UNITED STATES PATENT OFFICE.

WILSON MORTON, OF CHICAGO, ILLINOIS; SIDNEY CARR CARROLL, ADMINISTRATOR OF SAID MORTON, DECEASED, ASSIGNOR TO THE UNITED STATES SALES BOOK COMPANY, OF CHICAGO, ILLINOIS, A CORPORATION OF ILLINOIS.

SELF-SEALING MANIFOLDING WRITING-SHEET.

SPECIFICATION forming part of Letters Patent No. 755,159, dated March 22, 1904.

Application filed December 27, 1902. Serial No. 136,833. (No model.)

*To all whom it may concern:*

Be it known that I, WILSON MORTON, a citizen of the United States, residing at Chicago, Cook county, Illinois, have invented certain new and useful Improvements in Self-Sealing Manifolding Writing-Sheets, of which the following is a specification.

This invention relates to stationery, and has particular reference to writing-sheets and mailing-envelops therefor.

The objects of the invention are to expedite correspondence, save time, material, and labor, and encourage a greater degree of promptness in the transaction of business through correspondence.

My invention is designed, primarily, to meet a necessity which has always been felt by traveling salesmen, collectors, railway agents, and all other persons in similar callings who have occasion to make regular reports to their employers or superiors. As is well known, in all commercial establishments employing traveling salesmen an ever-recurring source of friction and annoyance to all parties concerned is the lack of prompt reports. This lack of promptness is due in a large measure to inconvenient correspondence facilities. While a traveling man is usually supplied with regular report-blanks, reliance is placed upon facilities *en route* for the rest of his requirements in the way of stationery and for writing conveniences to enable him to use his own equipment, consisting usually of a variety of original and duplicate blanks, carbon-paper, &c., not adapted for carrying in the pocket or available except at the hotel where his baggage is. The business transactions are therefore recorded in the form of temporary memorandums made on the spot and regular reports put off to await more favorable opportunities. A salesman when making out orders to be mailed to his house is usually required to make these in duplicate or triplicate, which is often done by copying and recopying an order the requisite number of times, or with the aid of a variety of stationery, carbon-sheets, and the like, which includes an equipment not adapted to carry in the pocket or to be used without regular writing facilities. Orders are therefore hastily copied on any kind of material conveniently at hand and the making of regular original and duplicate copies deferred for a special sitting at the hotel, with the result that sales memorandums are sometimes allowed to accumulate for days and some of them lost in this haphazard handling.

One of the chief objects of my invention is to provide a letter-head or order-sheet which shall combine in one article the original and duplicate sheet or sheets, the carbon-sheet or sheets, and the mailing-envelop for the order to be mailed to headquarters—in other words, to provide the salesman with a folded sheet of paper upon which he can write the original order on the spot or at the time it is given and in final form, and which will furnish him with one or more copies of said order as well as the mailing-envelop.

Another and a particular object of the invention is to provide jobbers, large mercantile establishments, transportation companies, and the like with the above device for distribution among their customers and correspondents to facilitate business intercourse, and thereby increase business.

A still further object of the invention is to provide the stationery described at a minimum of cost or at an expense so small as to make it possible to distribute same among small merchants, dealers, and others free of cost to them.

My invention consists, generally speaking, in a sheet of paper which comprises the address portion of an envelop and the gummed flap therefor and said sheet having a detachable carbonized portion or several thereof adapted to overlap an uncarbonized portion.

The invention further consists in a sheet of paper adapted to be folded into envelop form, provided with an address portion, a sealing-flap therefor, and one or more detachable carbonized sheets of paper overlying the first-mentioned sheet and adapted to transmit copy impressions thereto.

The invention further consists in a combined mailing-envelop and letter copy-sheet and a detachable carbonized original letter-sheet adapted to fold thereupon and transmit carbon impressions to the first-mentioned sheet.

The invention further consists in a combined letter-head and envelop and a duplicate letter-head, one thereof having transfer material on its one side and said sheets being adapted to overlie one another; and the invention further consists in the various details of construction and in the combinations of parts, all as hereinafter more fully described, and particularly pointed out in the claims.

The invention will be more readily understood by reference to the accompanying drawings, forming a part of this specification, and in which—

Figures 1, 2, and 3 represent the part adapted to be mailed and envelop portion thereon and the carbonized portion or portions as integral or attached portions folding, respectively, endwise and sidewise upon the envelop portion and part adapted for mailing, the address side of the envelop portion being on the opposite side of the several views. Fig. 4 is similar to Fig. 1 with the addition of side flaps for the envelop portion. Fig. 5 is similar to Fig. 1, except that the sheet having the transfer material folds from the top of the mailing-sheet instead of the bottom, as in Fig. 1. Fig. 6 is similar to Fig. 2, with the sheet or sheets folded ready for the writer. This view is also substantially a view of all the other figures with the device in writing position. Fig. 7 is substantially Fig. 6 enlarged, showing the appearance of Fig. 1 folded instead of Fig. 2 folded, as in Fig. 6. Fig. 8 represents the appearance of either of the foregoing views with the sheets folded ready for sealing. Fig. 9 is the reverse side of Fig. 8, and Fig. 10 is the form shown in Fig. 4 and is the same as Fig. 8 with the added side flaps.

In the several views of the drawings, 2 represents the letter-head provided with an envelop portion 3.

4 is the flap of the envelop portion.

5 is the carbonized side of the writing sheet or sheets 6, overlying sheet 2, and 7 7 are the side flaps in the modified form of construction.

In Figs. 1 and 7 the parts 2, 3, 4, 5, and 6 are comprised in one continuous sheet of paper folded on the line $y$ $y$ of Fig. 1. The opposite side of sheet 2 may be plain or provided with an envelop-border bearing a printed return-card and stamp-square, as shown in Fig. 9. In Figs. 2, 3, 4, 5, and 6 the sheet bearing the transfer material is a separate sheet pasted on sheet 2, which construction is particularly adapted for the purpose when it is desired to provide a sheet 2 of better quality than sheet or sheets 5. Fig. 3 shows two sheets 5 for the purpose of providing for both duplicate and triplicate copies. All of the views illustrate a construction which permits of the embodiment in a single piece of paper of the parts 2, 3, 5, 6, and 7. Figs. 1 and 7 illustrate my invention in the form of a continuous length or strip of paper perforated on the line $y$ $y$ to fold endwise. Fig. 5 also shows endwise-opening flaps 2 5, which may be either in one sheet of paper, with the flap pasted on, or the carbonized sheet 5 pasted on the integral parts 2 4. It is obvious that the arrangement shown in Figs. 2 and 3 may be embodied in a single piece of paper, as well as separately, with or without longitudinal perforations similar to the transverse perforations shown in Fig. 1.

In all of the above constructions the relative position of the writing and carbon portions when ready for impressions are exactly the same, presenting substantially the appearance shown in Figs. 6 and 7, disregarding the turned-up portion of the top sheet, which is the fundamental idea in my invention, the relative positions of the different parts, when spread out being susceptible to many modifications. The different arrangements are adaptable to varying conditions of portability, packing, shipping, and carrying about in the pocket, although as a rule all of the forms of construction shown are equally adapted for the latter purpose, since they occupy the same space when folded as shown in Fig. 9, or practically that of but a single envelop.

From the foregoing the manner of using my invention is self-evident. The side 5 of sheet 5 6 is placed upon the side 2 and the letter, order, report, &c., written upon the page 6, which writing is transferred to page 2 or to both page 2 and another page 6 if the arrangement shown in Fig. 3 is used. After the writing is completed sheet 5 6 may be torn off from sheet 2 and the latter folded from the bottom toward the flap 4, which may then be sealed upon the back of the page 2. On arrival at destination the flap 4 is cut open, as an ordinary envelop, leaving the letter or order portion clear.

There are several advantages which accrue to the addressee as well as the writer employing my invention. A great deal of time is saved in opening the mail, as opening the envelop opens the letter in the same operation. Again, the envelop with its records of post-marks and other mailing evidences is preserved with the letter without taking up any space. Oftentimes envelops are pinned to letters or orders for the purpose of future identification of the writer when he has failed to sign his name, to prove the time of mailing of a letter, or other evidences which subsequent developments may prove valuable and such as only a mailed envelop can furnish. It not infrequently happens that laborious searches are made through waste paper for the purpose of finding envelops, and my invention saves envelop and letter together without special thought or attention. If a writer desires to employ my invention for the purpose of private correspondence or social letters and for that purpose must write the original copy on the part mailed while desiring to keep the transferred copy, he can do so by tearing off the sheet on which the transfer material is and employ said sheet as an ordinary carbon-paper, same being always at hand and convenient, being a part of the letter-head. The invention also provides a device which may conveniently be used as a newspaper-wrapper. It is also obvious that gummed flaps 4 or 4 and 7 may be separate parts gummed on the various forms of single or double folded sheets. When the end flaps 7 are added, as in Figs. 4 and 10, the letter may be sealed up against inspection as thoroughly as if an ordinary correspondence-envelop is employed. The invention may be adapted to a large range of similar uses, and many modifications may be made therein by one skilled in the art to which it appertains without departing from the spirit of my invention, which I therefore do not confine to the specific constructions herein shown and described.

Having thus described my invention, I claim as new and desire to secure by Letters Patent—

1. A writing-sheet comprising an original writing-page, a copy-page, a carbon transfer-page, and a sealing-envelop portion.

2. A writing-sheet comprising portions adapted to fold into original and duplicate manuscript leaves having a transfer-page therebetween, and one of said leaves being provided with an ensealing portion.

3. An article of the class described comprising an original writing-leaf, a detachable copy-leaf, and suitable transfer material therebetween, one of said leaves being provided with sealing means.

4. A writing-sheet partly coated with a transfer material and adapted to be folded into, successively, an original manuscript page, a carbon-page, a copy-page and a mailable manuscript, the latter having a sealing-flap.

5. An article of the class described comprising individually-detachable original and duplicate manuscript leaves, each thereof except the last having a transfer-page adapted to transmit writing to the underlying page, and one of said leaves being provided with an ensealing portion.

6. A writing-sheet comprising an ensealing portion and a plurality of writing-sheets adapted to fold upon each other with a carbonized surface therebetween and a sealing-flap upon one of said folded portions.

7. A sealing-sheet of paper provided with an integral or substantially integral original manuscript leaf coated with a transfer material adapted to transfer writing upon said sealing-sheet.

8. A writing-sheet, consisting of a sheet of paper carbonized upon substantially one-fourth of its surface and provided with a sealing-flap, said writing-sheet being adapted to be folded upon itself with the carbonized surface between the folds and the sealing-flap upon the uncarbonized fold.

9. A manifolding writing-sheet consisting of a writing-sheet having a carbonized surface covering substantially one-fourth of its surface, an envelop portion opposite said carbonized portion, and suitable perforations between said carbonized and uncarbonized portions facilitating separation thereof, the uncarbonized portion being provided with means for sealing the same when folded.

10. A manifolding writing-sheet adapted to be folded upon itself and comprising when folded two detachably-connected leaves or original and duplicate manuscript portions, a carbonized surface on one leaf and between both thereof, and a sealing and address portion on the other leaf, one of said sheets being adapted to receive original impressions and to transmit same to the other leaf, the latter leaf being adapted to fold into envelop form and to be sealed upon itself by said flap.

In testimony whereof I have hereunto subscribed my name in the presence of two witnesses.

WILSON MORTON.

Witnesses:
J. W. BECKSTROM,
F. E. STEWART.